United States Patent Office 3,199,992
Patented Aug. 10, 1965

3,199,992
CERAMIC BUILDING UNITS
Roy B. Moffitt, Raleigh, N.C., assignor, by mesne assignments, to Royall B. Moffitt, Pleasant Garden, N.C., and Harrison E. McCandlish, Arlington, Va.
No Drawing. Filed July 13, 1961, Ser. No. 123,611
15 Claims. (Cl. 106—39)

This invention relates to structural ceramic articles, and more particularly to a novel method of their production utilizing novel ceramic compositions. The preferred application of the present invention is in building block and refractory block production and the following description is made generally in this connection.

Until the present invention, there has been an insistent but unfulfilled demand in the structural clay and refractory industries for a ceramic building block unit capable of mass production and competitive with concrete blocks of similar style and refractory shapes possessing the same or similar geometry. Within the structural clay products industry, such blocks have two primary advantages over concrete block: (1) a ceramic unit will not undergo the undesirable volume change which is encountered with concrete block after they are in a structure as a result of the continued hydration of the Portland cement used as a bond agent, and (2) they do have the natural coloring of structural clay units which makes them of immediate aesthetic value; however, these units can be easily colored or glazed by presently well know ceramic processes. In addition, the ceramic units are relatively lightweight, highly sound absorbent, possess good insulating properties, compressive strength and a pleasing texture.

In the refractory industry, the same advantageous properties listed above would apply except that the refractory shape or building unit would be used in structures that would normally require a load bearing refractory wall of good insulating characteristics. Normally, refractory shapes of concrete blocks size are not presently manufactured because of the inherent difficulties in forming and firing such block in large refractory sizes.

In the past, concrete block size textured ceramic units have uneconomically made by the extrusion of a plastic mass which was later textured mechanically. More recently, these same units were formed from gritty compositions by the use of conventional or slightly modified concrete block machinery. In most cases, this gritty composition containing a large percentage of an aggregate with a small percentage of plastic or semi-plastic materials which was subsequently used as the primary source of the ceramic bond during the firing of the ware.

Briefly, the present invention provides textured, lightweight, dimensionally stable, ceramic building units which may be formed by conventional or slightly modified concrete block machinery. The ceramic body composition is comprised of refractory aggregate, a bonding or glass forming aggregate, dry strength binder and water in suitable amounts which is thereafter formed, dried and fired under conditions to be described. The ceramic body composition is such that the ware is stable even under relatively large loads in the klin and undergoes a very low percentage of shrinkage during the firing process i.e., usually less than 2% as compared to an extruded or dry pressed clay composition having a maximum of approximately 7% obtained under currently known prior art methods.

In another embodiment of this invention it is possible to obtain zero percent shrinkage by utilizing expansible materials such as unweathered expansible shales or minerals for example, in the ceramic body composition. The expansible material will partially expand during firing, and may simultaneously form a glass or sintered bond with other surrounding particles. Such expansion is of a degree sufficient to prevent ware disfigurement during firing.

To manufacture a textured ceramic block with the same or similar geometry as conventional concrete block possessing the physical properties inherent in the ceramic product, several basic principles should be followed, assuming conventional or only slightly modified concrete block machinery is to be used in forming, and that conventional tunnel type kilns commonly employed to fire face and/or common brick are to be used to fire the ware.

First, the physical nature of the composition used should be compatible with the forming demands of concrete block machinery. Therefore, the ceramic body composition should not be plastic or gummy while it may be either "harsh" or slick to the feel. For this reason clay is not an essential ingreditent in the ceramic body compositions of this invention, and should only be used to the extent that no plasticity is evident in the composition if concrete block machiner is used for forming since clay literally "gums up the works" of a concrete block machine. The term clay, is used herein in the same sense as defined in the Glossary of Geology, American Geological Institute, 2nd Edition, November 1960, page 52, which definition is hereby included by reference in this specification. Thus, clay particles may be presented where an amount of weathered shale is used since shale, by definition, is consolidated clay or clay-like particles. However, the composition as a whole should not be plastic and any amount of ingredient clay particles should be incapable of manifesting itself by creating any apparent plasticity in the mix.

A harsh mixture is one that contains a predominant percentage of gritty particles and has no apparent plasticity. However, the composition may be slick or greasy to the feel in the same sense as are the minerals talc, prophyllite, or sericite and still be compatible with the forming machinery. The term slick or greasy should not be confused with plasticity in any way.

Second, provision should be made where necessary, for adequate dry strength of the ware. Generally, a sufficient amount of dry strength binder is used to impart adequate dry strength compatible with mass production handling techniques in the dry state, without excessive ware breakage. A dry strength binder, minimum of about ¼ to ½ percent by weight of the total wet composition is adequate using presently known commercial dry strength binders.

Third, the water content of the composition should be adequate to insure the required compressive strength, absorption, and texture in the fired ware. The water must not be enough to allow excessive migration of the fine particles, usually the —35 mesh fraction from the inside of the body to the ware-mold interface during forming. This migration results in a slick surface, high compressive strength, low absorption, and increased shrinkage in the fired body. The water content of the composition is a compromise between the texture requirement, maximum absorption, desired limit of shrinkage, and minimum compressive strength in the fired state. This water content will vary slightly from composition to composition depending on the type of aggregate used, lightweight or otherwise, and the particle size distribution present in the entire mix, the working range of the water content being from 6.6 to 17.7% by volume. It is therefore simply a function of the total surface area of the particles present in the composition. Shown below is a sieve analysis of a typical successful and practical composition that required nominally 12% water by weight to achieve all of the desired properties that have been previously discussed.

| Mesh—Tyler Standard | Percent retained |
|---|---|
| −6+8 | 0.25 |
| −8+10 | 12.47 |
| −10+14 | 22.70 |
| −14+20 | 18.54 |
| −20+35 | 20.17 |
| −35+48 | 4.25 |
| Pan | 21.62 |

And fourth, the final composition should be so pyrochemically designed that mass production techniques can be employed with a reasonably low percentage of non-salable ware. Assuming use of conventional or slightly modified concrete block machinery for forming, and a conventional tunnel kiln for firing the ware, the composition from which the ware is formed should be composed of materials gritty and/or slick in nature but not plastic. This is almost automatically excludes materials high in non-cryptocrystalline quartz and calcium carbonate content, and suggests simple and complex hydrous aluminum silicates. However, this does not exclude other possible ceramic raw materials such as talc, etc., that are not aluminum silicates but pyrochemically compatible. To use mass production techniques one must be able to stack dry ceramic ware high as the kiln will allow without significant deformation during firing as a result of load. The composition should also be so compounded that the fired ware has a low percentage of linear shrinkage. If these two characteristics, insignificant load deformation and low shrinkage, can be achieved then the requirements of a dimensionally stable unit have been satisfied.

In accordance with this invention the pyrochemical design of a ceramic body composition is such that it is based on the pyrochemical properties (P.C.E., i.e., Pyrometric Cone Equivalent, ASTM Designation C 24–46) of the bonding phase aggregate. Thus, it is preferred that the refractory phase P.C.E. be approximately eight cones to nineteen Orton Standard Cones more refractory than the bonding phase aggregate.

The firing schedule is also based on the bonding phase P.C.E. in that the firing time and temperature is regulated so that the actual cone achieved in the kiln is no more than one cone less than the P.C.E. of the bonding phase, and preferably is the same as the bonding phase P.C.E.

Accordingly, it is primary object of this invention to provide ceramic building units which are dimensionally stable, textured, lightweight, and which can be mass produced or produced by other methods.

Another object is to provide a ceramic body composition including refractory and bonding aggregates and dry strength binder, the aggregates having predetermined pyrochemical (P.C.E.) properties such that ware formed from the composition will undergo relatively insignificant total linear shrinkage and insignificant deformation as a result of load during firing.

Another object of the invention is to provide a composition of matter from which ceramic ware may be produced which embodies expansible refractory or bonding material or both and to provide a method of producing the ware by utilizing such composition whereby at least partial expansion and simultaneous bonding either by sintering or glass formation occurs, without any significant disfiguring of the fired product resulting from excessive expansion of the expansible material.

It is a further object of this invention to provide ceramic body compositions having as essential ingredients thereof, relatively refractory phase aggregate, bonding phase aggregate, dry strength binder, and water, the majority of which is subsequently removed.

Another object is to provide a novel process for producing ceramic ware in which a ceramic body composition is fired under a novel firing schedule to achieve a non-disfigured ceramic article having at least partially expanded shale particles therein expanded as a result of the firing.

Other objects and advantages of the present invention will become apparent to those skilled in this art from the following description and appended claims.

In carrying out this invention a ceramic body composition may be formed having, in general, the following relative amounts of essential ingredients:

| | Preferred Parts by Volume | Range Percent by Volume |
|---|---|---|
| Refractory phase aggregate | 5 | 50–80 |
| Bonding phase aggregate or material | 3 | 20–50 |
| Water | 1 | 5–30 |
| Dry Strength Binder (½% by weight of total composition including water) | | |

Other additional materials in minor amounts may also be used to create voids in ware or higher temperatures in the kiln as a result of their subsequent combustion in the kiln during firing, or to treat the surface of the ware to produce ceramic color or glaze.

Such materials are well known and include respectively, "burn-out" materials (e.g., sawdust, cork, coal, graphite, or similar materials which ignite at temperature in the order of 400° F. or greater), or materials such as spinels which upon firing impart a permanent color to the surface of the ware, or materials which form a glassy surface (commercial frits which may be colored or matte in the fired state).

The relative weights of the individual ingredients may vary considerably and are not critical and are therefore given in terms of parts by volume or percent by volume since the amount of water required and the pyrochemical interaction are dependent on the total relative surface area of refractory and bonding phases.

Suitable refractory materials are those which differ from the bonding phase aggregate P.C.E. by 8 to 19 cones. In producing structural ceramic blocks for normal building purposes, bonding aggregate P.C.E. range from about 016 to 7. Therefore, the refractory aggregates should have a P.C.E. of between 08 and 30. Examples of such refractory aggregates are: (1) naturally occurring (unweathered) greenstone, arkose (e.g., feldspar grains, cemented together by limonite), rhyolite, and siltstone; and (2) manufactured sintered clay aggregates or products formed from unconsolidated clays or shales or mixtures thereof. Sintered clays are, for example, brick grog, i.e., crushed brick, sewer pipe, drain tile, face brick, or the like, and Tuff-Lite, a lightweight aggregate manufactured by mixing clay with finely divided organic material and expanded by igniting the latter and burning off the organic material while simultaneously forming a glass within the clay to result in bloating.

In producing refractory ceramic units in accordance with this invention the bonding phase should have a P.C.E. of between 8 and 20, and the refractory phase should therefore have a P.C.E. of between 16 and 40, and may be for example, kyanite, fosterite, olivine, pyrophyllite, and corundum. Suitable bonding aggregates having a P.C.E. of between 016 to 7 are (1) naturally occurring diabase, diorite, hornblende, gneiss, unweathered or weathered shales, sericite phyllites, gabbro, trap rock (dark felsitic igneous rock), and feldspars, and (2) manufactured Solite, Stalite, and Weblite. Solite and Stalite are commercially available materials made by bloating an unweathered expansible shale either in a rotary kiln or on a traveling grate. Usually no organic matter is deliberately mixed with the unweathered shale as in the manufacture of the lightweight refractory aggregate Tuff-Lite, the bonding aggregate Weblite mentioned above. Examples of bonding aggregates having a P.C.E. between 8 and 20 are brick grog, shales (fireclay or otherwise), slates, massive sericite, rhyolite, volcanic breccia, talc, and acid tuffs. As is apparent, the bonding materials in this group are capable of use as either a refractory or bonding phase depending upon the characteristics desired of the finished ware, i.e., refractory of normal building structures.

Suitable dry strength binders are lignin sulfonics such as "Polyfon," a dispersant consisting of sulfonates of pine wood lignin, "Goulac," Additive "A" and Additive "B" and inorganic compounds such as potassium and sodium silicates.

A preferred composition of this invention is as follows:

EXAMPLE I

|  | Parts by Volume | −8 Mesh, lbs. cu. ft. | P.C.E. |
|---|---|---|---|
| Brick grog | 1 | 85.0 | 15 |
| Calcined clay (Tuff-Lite) | 3 | 71.0 | 14 |
| Expanded shale (Stalite, Solite) | 2 | 74.0 | 5.6 |
| Weathered shale and/or sericite phyllite | 1 | 88.0 | 9–12 |
| Binder (¼% by weight of the composition including H₂O) |  |  |  |
| Water | 1 | 62.4 |  |

If desired, any of the bonding phase aggregates i.e., trap rock, diorite, diabase, gabbro, and other basic igneous rocks, and other substances of like P.C.E. such as feldspar, and other acid minerals, feldspar, etc., may be substituted in equal amount for expanded shale. These materials weigh approximately 98 lbs. per cu. ft. for a particle size distribution of 100% −8 mesh as described above.

It is preferred that approximately ⅓ of the bonding phase material be weathered shale and/or sericite phyllite since such material enhances formation of sharp corners on the ware during forming, lubricates the mold-ware interface during the block forming stage, but does not contribute any apparent plasticity to the composition, and it helps produce a definite brick red as the fired color of the ware. It should be understood however, that weathered shale and/or sericite phyllite is not an essential ingredient but is preferred for the stated reasons. Thus, if desired, the bonding phase material in Example I may be composed solely of expanded clay or shale, especially since the results obtainable from weathered shale and/or sericite phyllite may also be achieved by using unweathered, gritty shale with a slightly modfied particle size distribution as will be described later.

A composition according to Example I is prepared by crushing and sizing all materials to sizes between −7 to −10 Tyler Standard Mesh (unless otherwise indicated mesh therein refers to the Tyler Standard). The materials are preferably all about the same size (−8 mesh), that is, the maxiumum particle size is such that the largest particles will pass through a 8 mesh screen, the smaller particles grading to dust as exemplified by the following typical sieve analysis.

*Typical sieve analyses of various raw materials in Example I and succeeding examples*

| Mesh—Tyler Standard | Expanded shale, percent retained |
|---|---|
| 6 | 0.15 |
| 8 | 0.13 |
| 10 | 14.84 |
| 20 | 41.94 |
| 35 | 18.46 |
| 48 | 5.62 |
| 100 | 8.63 |
| Pan | 10.23 |

| Mesh—Tyler Standard | "Tuff-Lite," percent retained |
|---|---|
| 6 | 0.15 |
| 8 | 0.85 |
| 10 | 20.05 |
| 20 | 44.53 |
| 35 | 17.32 |
| 48 | 5.35 |
| 100 | 6.53 |
| Pan | 5.22 |

| Mesh—Tyler Standard | "Weathered Shale" or Sericite Phyllite, Percent Retained | "Brick Grog," Percent Retained |
|---|---|---|
| 6 | 0 | 0.19 |
| 8 | 0.42 | 9.58 |
| 10 | 4.92 | 12.80 |
| 20 | 32.00 | 37.90 |
| 35 | 23.01 | 21.10 |
| 48 | 8.14 | 6.80 |
| 100 | 11.40 | 11.71 |
| Pan | 20.11 | 8.92 |

If the size of the individual raw materials is increased above 100% −7 Tyler Standard Mesh, there is a corresponding decerase in compressive strength, an increase in absorption, a decrease in linear shrinkage, and a gradual loss in pleasing texture. If the particle size of the materials is decreased excessively, there is an increase in compressive strength, decrease in absorption, increase in linear shrinkage, and a definite loss of pleasing texture.

To prepare the composition of Example I, the dry aggregate materials are intimately mixed with each other and thoroughly with 0.5 in 7.5 parts to 1.5 in 8.5 parts by volume (the prefered amount of water) or 7 to 17% by weight of the entire composition of water containing a minimum of ¼% by weight of the entire composition including water, of conventional dry strength binder which is used primarily to obtain strength in the dry ware. The resulting wet composition is fed into conventional or slightly modfied concrete block machinery to form the desired green ceramic block and the formed ware is then dried to a moisture content of about 1% by weight or less.

If the percentage of water used is below 0.5 in 7.5 parts by volume, the resulting fired ware will not have adequate fired compressive strength to meet the specifications described in ASTM Designation C 90–44 and this minimum amount is therefore preferably maintained. If the water content exceeds 1.5 in 8.5 parts by volume, the resulting green and fired ware will have a slick surface, increased total linear shrinkage and an excess of fired compressive strength. Moreover, deviation from the optimum 1 in 8 parts by volume water figure appreciably affects compressive strength, absorption, total linear shrinkage and texture.

Normally the percentage of presently known dry strength binders is critical only if below ¼% by weight. Even though the dry ware moisture content is below 1% by weight, manufacturing procedures require a dry strength in the ceramic block that is achieved only if the dry strength binder is ¼% by weight or greater. Accordingly, any excess of the stated percentage is purely a matter of economics and, of course, any other binder materials used in the ceramic industry may be used for this purpose if they provide the desired strength in the dried ware.

The dry block is stacked in stands on kiln cars and subsequently fired in a tunnel kiln without significant deformation as a result of load during firing. The firing schedule should range between eight and fifty hours under a kiln temperature adjusted to the time schedule so that a maximum cone achieved by the kiln schedule is approximately the P.C.E. of the bonding phase aggregate.

The following sieve analysis comparison shows the slight adjustment of particle size distribution of the entire composition of Example I which should be made for best results in forming a desirable ceramic block from materials that are entirely gritty or harsh and have no plastic or weathered materials in the composition. The major difference between the two sieve analyses is the slight increase in the −20+48 fraction and the sharp reduction in the −48 mesh fraction when 100% gritty unweathered materials are used.

| Mesh—Tyler Standard | Composition Containing All Gritty Materials, Percent Retained | Dry Composition Containing 1 in 7 Parts of Weathered Shale or Sericite Phyllite, Percent Retained |
| --- | --- | --- |
| −6+8 | 0.45 | 0.45 |
| −8+10 | 12.26 | 12.47 |
| −10+14 | 19.48 | 22.70 |
| −14+20 | 17.59 | 18.54 |
| −20+35 | 29.49 | 20.17 |
| −35+48 | 12.26 | 4.25 |
| Pan | 8.47 | 21.62 |

In any discussion of compositions from which a textured body is to be made, it is assumed that the water content is appropriately adjusted so as to make a textured body possible under the given forming conditions. Almost any body composition of a given sieve analysis can be so "loaded" with water that only slick bodies result during forming by the use of concrete block machinery. It must be emphasized that the water content greatly influences the texture, absorption, shrinkage, and compressive strength. Therefore, any composition, regardless of its sieve analysis, must be compatible with the water content if a desirable balance is to be achieved between physical and aesthetic properties.

In summary, following the above description, ceramic blocks have been produced in accord with the composition of Example I having the following physical properties:

(1) A maximum of 2% total linear shrinkage from green to fired state.

(2) A minimum of 1,400 pounds per square inch compressive strength as determined by ASTM Designation C 40–39.

(3) A pleasing surface texture which, in this particular case, using geological terminology, is similar to an oolitic limestone. However, in this case, the individual particles in the ceramic block body are not rounded as in an oolitic limestone, but are fragmental. Therefore, it can be said that the texture is homogeneously fragmental and porous, but comparable to an oolitic texture in general over-all appearance. This texture is characterized by the distinct visibility of the individual larger particles, generally those in the −6+20 Tyler Standard mesh fraction which are distributed uniformly over the surface. The finer particles, generally −20 mesh, fill most of the space between the large particles and are the ones to which the pyrochemical bond is attributed. Small pores of uniform size are visible and are also homogeneously distributed over the surface.

(4) A maximum of 15% absorption as determined by ASTM Designation C 67–44, 24-hour submersion test.

(5) A two core ceramic block measuring substantially 5″ high, 8″ wide, and 16″ long, will weigh a maximum of 20 pounds.

(6) If eight unfired ceramic block of the previously cited dimensions and composition are stacked in a stand not over eight block high and fired to Orton Standard Cone 5, there will be no deformation of any of the block during firing as a result of load if the measurements are taken to the nearest $\frac{1}{16}$ of an inch. It is this characteristic that allows this unique ceramic block to be adaptable to mass production techniques.

Other examples similar to the compositions in Example I are:

| | (Parts by Volume) | | | | | | |
| --- | --- | --- | --- | --- | --- | --- | --- |
| Example Number | II | III | IV | V | VI | VII | VIII |
| Brick grog (P.C.E. 15) | 1 | 1 | 1 | 2 | 3 | | |
| Tuff-Lite (P.C.E. 14) | 2 | 1 | 2 | 2 | | 4 | |
| Expansible shale (Stalite) (P.C.E. 5–6) | 3 | 4 | 3 | 2 | 2 | 2 | |
| Weathered shale and/or sericite phyllite (P.C.E. 9–12) | ½ | 1 | 1 | 1 | 1 | 1 | |
| Water | 1 | 1 | 1 | 1 | 1 | 1 | |
| Dry strength binder (¼% by weight) | | | | | | | |
| Cryptocrystalline Rhyolite (P.C.E. 13) | | | | | | | 5 |
| Trap rock (P.C.E. 4) | | | | | | | 3 |
| Water | | | | | | | 1 |
| Dry strength binder (¼% by weight) | | | | | | | |

In the body compositions illustrated by Examples I through VIII total linear shrinkage during firing is normally 2% or less from the green to fired state and therefore is superior to previously known dry pressed or extruded bodies heretofore utilized in producing ceramic building units of concrete block size. However, it may be desirable to reduce the total linear shrinkage to 1% or less where, for example, extremely close ware dimensional tolerances must be maintained in recently developed masonary practices involving use of presently non-conventional mortar substitutes. Accordingly, in another embodiment of this invention an expansible material (preferably shales or pyrophyllite) is included in the ceramic body composition to aid in resistance to shrinkage which normally occurs during firing to the extent that shrinkage may be substantially eliminated. In connection with this embodiment of the invention, proper kiln temperature and firing time are important in obtaining optimum results.

The expansible material may be used in compositions for producing both normal building units as well as for refractory shapes. The following are exemplary compositions for normal building structures.

EXAMPLE IX

| | Parts by Volume | P.C.E. |
| --- | --- | --- |
| Brick grog | 1 | 15 |
| Calcined clay (Tuff-Lite) | 3 | 14 |
| Expansible shale | 2 | 5–6 |
| Weathered shale and/or sericite phyllite | 1 | 9–12 |
| Binder (at least ¼% by weight of the composition including $H_2O$) | | |
| Water | 1 | |

Using Examples I through VIII given above, suitable body compositions embodying an expansible material preferably expansible, unweathered shale may be compounded by substituting expansible material for all or any substantial part of the bonding phase. Thus, in Examples I through VIII expansible shale may be substituted for expanded shale in a like amount, or weathered shale or sericite phyllite may be replaced by the more gritty or harsh unweathered expansible shale, having an increased −20+48 mesh fraction within the particle size distribution to completely replace the slightly plastic or weathered material as described above.

The term unweathered expansible shale can be defined as any sedimentary rock that is substantially composed of consolidated clay (hydrous aluminum silicates both simple and complex) or clay-like particles in various percentages which are not plastic as a result of their consolidation into a rock. This mixture also contains substances that are capable of producing gases at commonly employed elevated temperatures. All shales are normally composed of various percentages of these two basic ingredients (clay and clay-like particles), and usually, the clay particles are a mixture of clay minerals such as the following: kaolinite, illite, dickite, montmorillinite, etc. The clay-like particles are also a mixture of various minerals some examples of which are talc and sericite. In an unweathered expansible shale, there are dispersed within the consolidated clay-like or clay mineral particles, materials that contain compounds normally capable of producing gases when they are subjected to an oxidizing atmosphere of 1000° F. or more. The genesis of these materials may be geologically either primary or secondary, and they can be any one or all of the following example materials or minerals: carbonaceous materials, free sulfur, siderite, pyrite, marcasite, etc.

The mechanism of an expansible material undergoing expansion upon the application of heat is predicated on the simultaneous evolution of gases and the formation of a glass. Normally, in commercial operations the glass formation is substantially an iron glass (from the mineral fayalite), and the evolved gases are in most instances $SO_2$, $SO_3$, $CO$, $CO_2$, etc. The above discussion basically defines the parameters that would ordinarily be encountered with any basic question concerning the definition or meaning of the term unweathered unexpanded expansible shale.

When employing a composition containing expansible shale the firing schedule should be so controlled that the Orton Standard Pyrometric Cone achieved by this schedule is equal to or no more than two cones less than the P.C.E. of the unweathered, expansible shale that is used (ASTM Designation C 24–46 procedure being used to determined the expansible shale P.C.E.).

In one firing using the composition of Example II and the above-mentioned firing schedule, 5" x 8" x 16" three core ceramic blocks were produced having a weight of 20 lbs., shrinkage 0.797 percent, 9.51% twenty-four hour cold water absorption, and 1,700 p.s.i. compressive strength. Absorption and compressive strength were determined by the procedure outlined in the ASTM Designation C 140–39.

The firing schedule bloats the unweathered, expansible shale at such a rate and to a degree of expansion that the previously discussed physical properties of the fired ware are achieved. This rate and degree of expansion of the unweathered, expansible shale particles is accomplished by regulating the heat per unit time input into the kiln so that the P.C.E. of the bonding material or expansible shale is substantially achieved (i.e., one cone below or above) in not less than seven nor more than thirty-six hours. If the time segment of the firing schedule is appreciably less than seven hours then there is a high probability of excessive expansion of the unweathered, expansible shale particles and consequent rupturing of the ware. If the time segment is appreciably greater than thirty-six hours then there is a reduction in the amount of bloating of the unweathered, expansible shale particles.

Usually, if the previous procedure is followed, the weight loss of the unweathered, expansible shale particles will be a minimum of 4% by weight. This weight loss can be more or less depending on the inherent pyrochemical bloating nature of the particular shale particles involved and the schedule used in firing the ware.

In the case of pyrophyllite, expansion during firing is achieved by a mechanism differing from the shale expansion in that no glassy phase is required to produce expansion. Therefore, the firing schedule may depart considerably from the 7–36 hour limits of the expansible shale firing schedule.

In producing refractory building units or shapes for kiln walls, crowns, and the like, the following compositions including an expansible refractory phase mineral (pyrophyllite for example) are preferred.

EXAMPLE X

|  | Parts by Volume | −8 Mesh, lbs. cu. ft. | P.C.E. |
|---|---|---|---|
| Pyrophyllite | 5 | 98.0 | 29–31 |
| Volcanic breccia | 3 | 98.0 | 8 |
| Water | 1 |  |  |
| Dry strength binder (at least ¼% by weight of composition including water) |  |  |  |

EXAMPLE XI

|  | Parts by Volume | −8 Mesh, lbs. cu. ft. | P.C.E. |
|---|---|---|---|
| Pyrophyllite | 5 |  | 29–31 |
| Brick grog | 3 |  | 15 |
| Water | 1 |  |  |
| Dry strength binder (at least ¼% by weight of total composition including water) |  |  |  |

These examples illustrate the principle of this invention wherein a refractory material is used having a P.C.E. of about 18 and 11 cones respectively more refractory than the bonding phase. It is to be understood that the P.C.E. of the bonding material should be achieved by the firing schedule, and that the refractory phase in this case expands in the absence of a glassy phase in the refractory aggregate phase and therefore at a cone much lower than the P.C.E. of the refractory phase mineral itself.

A practical application of the composition of Example X was made by forming a three-core block and firing to cone 8. The block was found to have the following physical properties: dimensions 15¹¹⁄₁₆" x 7¹²⁄₁₆" x 5⁵⁄₁₆", a weight twenty-five pounds, shrinkage 0%, compressive strength 1476 p.s.i., and absorption 6.6%. The kiln schedule was so designed that the P.C.E. of the bonding phase was achieved.

Instead of having only one expansible phase, both the refractory and bonding phases may expand during firing, as when utilizing the following composition.

EXAMPLE XII

|  | Parts by Volume | P.C.E. |
|---|---|---|
| Pyrophyllite | 5 | 29–31 |
| Expansible shale | 3 | 15 |
| Water | 1 |  |
| Dry strength binder (at least ¼% by weight of total composition including water) |  |  |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A composition of matter for producing ceramic building units consisting essentially of approximately 20–50 percent by volume of a non-plastic ceramic bonding phase aggregate, 50–80 percent by volume of non-plastic ceramic refractory aggregate having a pyrometric cone equivalent of about 8 to 19 cones above that of the bonding phase aggregate, dry strength binder in an amount sufficient to impart handling strength to said composition, and water in the range of 6.6 to 17.7% by volume, said amount of water being sufficient to permit dispersion of said dry strength binder and said aggregates into a substantially homogeneous combination said bonding and refractory phase aggregates each having a particle size of essentially 100% —7 Tyler Standard mesh.

2. A composition as defined in claim 1 wherein said amount of binder is present in approximately ¼% by weight of said composition including water.

3. A composition as defined in claim 1 wherein said bonding aggregate is approximately ⅓ weathered shale.

4. A composition as defined in claim 1 wherein said refractory phase aggregate is selected from the group consisting of greenstone, arkose, rhyolite, siltstone, volcanic breccia, olivine, kyanite, pyrophyllite, non-plastic shale, brick grog, and mixtures thereof, and wherein said bonding phase aggregate is selected from the group consisting of volcanic and cinder cone ashes, diabase, diorite, hornblende gneiss, unweathered non-plastic shales, sericite phyllite, gabbro, trap rock, feldspar, expanded sintered shale, and mixtures thereof.

5. A composition as defined in claim 1 wherein at least one of said aggregates is capable of expanding upon firing said composition to approximately the P.C.E of the bonding phase aggregate.

6. A composition as defined in claim 5 wherein said bonding phase aggregate includes a substantial amount of unweathered expansible shale and wherein said refractory phase aggregate includes a substantial amount of pyrophyllite, said pyrophyllite being capable of expanding at approximately the same P.C.E. of said expansible shale, said expansible materials being present to reduce the total linear shrinkage to less than 2% of ware formed from said composition.

7. A method of producing a ceramic building unit comprising mixing a ceramic body composition consisting essentially of 50–80 percent by volume of non-plastic ceramic refractory aggregate particles, 20–50 percent by volume of non-plastic ceramic bonding phase aggregate particles, said bonding phase aggregate particles having a P.C.E. of about 8–19 cones less than that of said refractory aggregate, water in an amount ranging from 6.6–17.7 percent by volume, and at least ¼% by weight of dry strength binder, forming said composition, reducing the moisture content of said composition to approximately 1% and firing said composition to an Orton Standard Pyrometric Cone approximately equal to the pyrometric cone equivalent of said bonding phase aggregate, said bonding and refractory phase aggregate particles being 100% —7 Tyler Standard mesh.

8. A method of producing a ceramic building unit comprising mixing a ceramic body composition consisting essentially of approximately 50–80 percent by volume of non-plastic ceramic refractory phase aggregate, 20–50 percent by volume of non-plastic ceramic bonding phase aggregate, said bonding and refractory phase aggregate particles being 100% —7 Tyler Standard mesh, 6.6–17.7 percent by volume water, and at least ¼% by weight of dry strength binder, at least one of said aggregates being sufficiently expansible at a cone approximately equal to the P.C.E. of said bonding phase aggregate to prevent substantial total linear shrinkage of said units, forming said composition reducing the moisture content of said composition to about 1% moisture and firing said composition to an Orton Standard Pyrometric Cone approximately equal to the pyrometric cone equivalent of said bonding phase aggregate in a kiln in about 7–36 hours.

9. A process as defined in claim 8 wherein both of said aggregates expand at a cone approximately equal to the P.C.E. of said bonding phase aggregate.

10. A process as defined in claim 8 wherein said bonding phase aggregate includes a substantial amount of expansible non-plastic shale.

11. The method defined in claim 13 wherein said refractory phase aggregate includes a substantial amount of pyrophyllite.

12. A method for forming ceramic building units comprising the steps of:
   (a.) providing a refractory ceramic aggregate selected from the group consisting of greenstone, arkose, rhyolite, siltstone, sintered clay aggregates, olivine, kyanite, pyrophyllite, volcanic breccia, non-plastic shale, and mixtures thereof,
   (b.) providing a ceramic bonding phase aggregate having a P.C.E. of about 8–19 cones less than that of said refractory aggregate, said bonding phase aggregate being selected from the group consisting of volcanic and cinder cone ashes, diabase, diorite, hornblende gneiss, non-plastic shale, gabbro, trap rock, feldspar, sintered shale, brick grog, and mixtures thereof,
   (c.) said refractory and bonding phase aggregates each having a particle size of approximately 100% —7 Tyler Standard mesh,
   (d.) mixing said refractory and bonding phase aggregates and adding thereto water ranging from 6.6 to 17.7% by volume and a dry strength binder to form a wet mass having approximately 50–80 percent by volume of said refractory phase aggregates and approximately 20–50 percent by volume of said bonding phase aggregates,
   (e.) imparting a molded shape to said wet mass,
   (f.) reducing the moisture content of the thus formed mass to less than 1% by weight, and
   (g.) ceramically bonding said thus dried mass by firing said thus dried mass to approximately the P.C.E. of said bonding phase aggregate.

13. A method for forming ceramic building units comprising the steps of:
   (a.) providing a refractory ceramic aggregate selected from the group consisting of greenstone, arkose, rhyolite, siltstone, sintered clay aggregates, pyrophyllite, kyanite, olivine, volcanic breccia, non-plastic shale, and mixtures thereof,
   (b.) providing a non-plastic expansible shale as a bonding phase aggregate, said aggregate having a P.C.E. of about 8–19 cones less than that of said refractory aggregate,
   (c.) the particle size of both said refractory and bonding phase aggregates being 100%—7 Tyler Standard mesh,
   (d.) mixing said refractory and bonding phase aggregates and adding thereto water ranging from 6.6 to 17.7% by volume and a dry strength binder to form a wet mass having approximately 50–80 percent by volume of said refractory phase aggregate and approximately 20–50 percent by volume of said bonding phase aggregate,
   (e.) imparting a molded shape to said wet mass,
   (f.) reducing the moisture content of the thus formed mass to less than 1% by weight, and
   (g.) ceramically bonding said thus dried ware simultaneously with expanding said expansible shale by firing the ware to the P.C.E. of said expansible shale.

14. A method for forming ceramic building units comprising steps of:
   (a.) providing pyrophyllite as a refractory phase aggregate,
   (b.) providing a ceramic bonding phase aggregate selected from the group consisting of volcanic and cinder cone ashes, diabase, diorite, horn blende gneiss, gabbro, trap rock, feldspar, sintered shale, brick grog, and mixtures thereof, said bonding phase aggregate having a P.C.E. of about 8–19 cones less than that of said pyrophyllite,
   (c.) the particle size of said bonding and refractory phase aggregate being 100% —7 Tyler Standard mesh,
   (d.) mixing said refractory and bonding phase aggregates and adding thereto water ranging from 6.6 to 17.7% by volume and a dry strength binder to form a wet mass having approximately 50–80 percent by volume of said refractory phase aggregate and approximately 20–50 percent by volume of said bonding phase aggregate,
(e.) imparting a molded shape to said wet mass,
(f.) reducing the moisture content of the thus formed mass to less than 1% by weight, and
(g.) ceramically bonding said thus dried ware and expanding said pyrophyllite by firing the ware to the P.C.E. of said bonding phase aggregate.

15. A method of forming ceramic building units comprising steps of:
(a.) providing pyrophyllite as a refractory phase aggregate,
(b.) providing an expansible shale as a bonding phase aggregate, said bonding phase aggregate having a P.C.E. of about 8–19 cones less than that of said pyrophyllite,
(c.) the particle size of said bonding and refractory phase aggregates being 100% −7 Tyler Standard mesh,
(d.) mixing said pyrophyllite and said expansible shale and adding thereto water ranging from 6.6 to 17.7% by volume and a dry strength binder to form a wet mass having approximately 50–80 percent by volume of said refractory phase aggregate and approximately 20–50 percent by volume of said bonding phase aggregate,
(e.) imparting a molded shape to said wet mass,
(f.) reducing the moisture content of the thus formed mass to less than 1% by weight, and
(g.) ceramically bonding said thus dried ware and expanding both said pyrophyllite and said expansible shale by firing said ware to the P.C.E. of said expansible shale.

References Cited by the Examiner
UNITED STATES PATENTS

| | | | |
|---|---|---|---|
| 1,809,214 | 6/31 | Pine et al. | 106—71 |
| 2,543,548 | 2/51 | Henry | 106—65 |

FOREIGN PATENTS

| | | |
|---|---|---|
| 558,901 | 6/58 | Canada. |

OTHER REFERENCES

Rogers, "Introduction to the Study of Minerals and Rocks," published 1921 by McGraw-Hill, New York City (page 442).

TOBIAS E. LEVOW, *Primary Examiner.*

JOHN R. SPECK, *Examiner.*